Patented Dec. 20, 1938

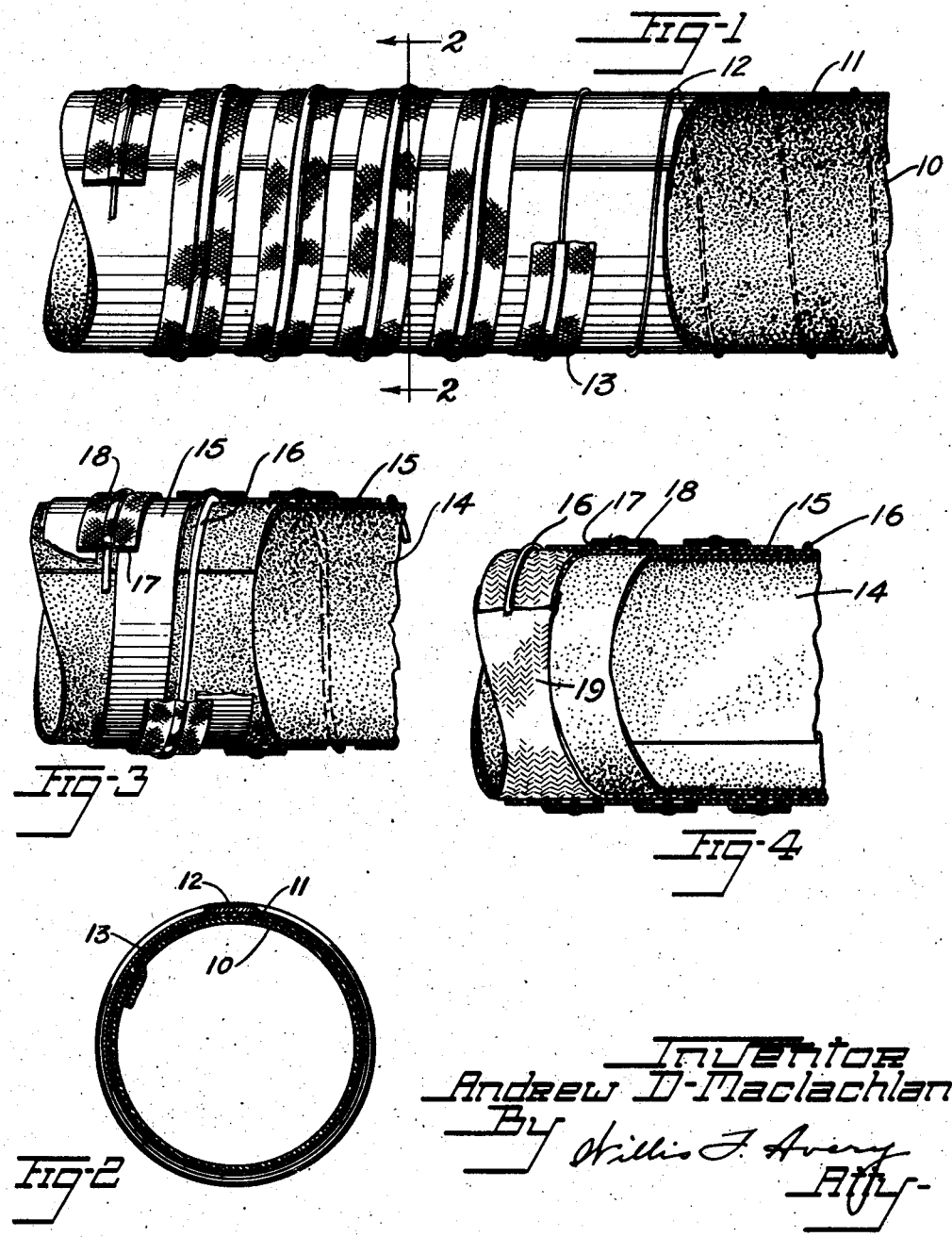

2,140,638

UNITED STATES PATENT OFFICE 2,140,638

VENTILATING HOSE

Andrew D. Maclachlan, Akron, Ohio, assignor to The B. F. Goodrich Company, New York, N. Y., a corporation of New York Application April 2, 1937, Serial No. 134,539

3 Claims. (Cl. 138—56)

This invention relates to ventilating hose and especially to hose for conducting air into and out of chambers such as the cabins of aircraft where it is desired to conduct the air without objectionably transmitting noise such as propeller and motor noise, from the exterior to the interior of the chamber.

The chief objects of the invention are to provide for conducting the air without objectionable transmission of sound and to provide hose for such purpose of a light and flexible construction that is suitable for conducting the air under pressure without objectionable leakage.

These and further objects will be apparent from the following description, reference being had to the accompanying drawing in which:

Fig. 1 is an elevation with parts broken away and sectioned of a ventilating hose constructed according to and embodying the invention.

Fig. 2 is a section taken along the line 2—2 of Fig. 1.

Fig. 3 is a view like Fig. 1 but showing a modified construction.

Fig. 4 is a view like Fig. 1 but showing a further modified construction.

Referring to the embodiment of Figs. 1 and 2, the ventilating hose comprises a lining tube 10 of a suitable flexible sound-deadening material, preferably felt. In order to prevent leakage of air under pressure the felt lining preferably has an outer layer or coating 11 of rubber which may be soft, flexible, and quite thin so as not to increase objectionably the flexibility or weight of the hose. For good adhesion a rubber cement may be applied between the felt tube 10 and the rubber layer 11. Upon the layer 11 is disposed a strip 12 of reinforcing material, preferably wire, applied in helical convolutions that are considerably spaced apart so as to provide extensive reaches of the yieldable hose wall between the convolutions effective to cushion non-resiliently the impact of sound waves against the wall and effect a deadening of the sound. For the purpose of retaining the reinforcing strip 12 in place without objectionable shifting a tape 13, preferably of rubberized, bias-laid, square-woven fabric, is mounted upon the strip reinforcement and has its margins adhered to the layer 11, the arrangement preferably being such that the convolutions of the tape 13 are spaced apart. This makes for flexibility and light weight of the structure and lessens the likelihood of transmission of sound waves through the materials of the hose body.

The parts above described may be assembled with the rubber in an unvulcanized condition and then the whole may be subjected to a vulcanizing operation to produce a homogeneous structure.

Apparently the success of this hose construction in conducting air without objectionable transmission of sound results primarily from the sound deadening construction of the hose wall, the areas of the wall between convolutions of the strip reinforcement being yieldable so as to cushion the impacts of sound waves and thereby to reduce or eliminate the reflection of sound waves striking the wall, and to prevent reverberation of the sound within the tube. Also the interior surface of the hose, which is of felt, is in itself an inhibitor of sound reflection, and the hose construction is such that its wall strongly resists transmission of sound waves longitudinally through the wall.

In the embodiment of Fig. 3 the materials upon the felt tube of the hose wall are in layers discontinuous in the direct axial direction for the purpose of further reducing the likelihood of sound transmission through the materials of the hose body. Upon the felt lining 14 is disposed a band 15 of rubber, which, as distinguished from the continuous form of the rubber layer 11 in Fig. 1, is disposed in spaced apart helical convolutions in the embodiment of Fig. 3. A coating of cement may be employed upon the lining 14 in order to facilitate adhesion with the band 15. Between the convolutions of the band 15 is disposed a strip reinforcement 16, preferably wire, in helical convolutions. Preferably the spacing is such that the strip reinforcement 16 does not contact the band 15 of rubber. In order that the strip reinforcement 16 does not shift objectionably from its assembled position one or more superimposed tapes 17, 18, preferably of rubberized bias-laid, square-woven fabric, are applied upon the strip reinforcement 16 with their margins adhered to the band 15 of rubber and with the margins of adjacent convolutions of the tapes spaced apart. Thus the only direct axial continuity of the hose materials resides in the lining 14, which, however, is of felt and is in itself a poor sound conductor.

In the embodiment of Fig. 4 a somewhat stronger construction is provided, without however rendering the hose wall objectionably transmissive to sound waves. This embodiment is like the construction of Fig. 3 except that an additional layer 19 is incorporated between the felt lining and outer materials. This layer preferably is of a light, open-mesh fabric, such as stockinet, which, while it reinforces the hose desirably, especially at the zones between the convolutions of the outer fabric tapes, does not make the hose wall materially less resistant to the directly axial transmission of sound waves, and does not handicap the wall in its function of deadening reverberations in the tube.

Variations may be made without departing from the scope of the invention as it is hereinafter claimed.

I claim:

1. Ventilating hose comprising a yieldable wall having an inner layer of sound-deadening felt, a layer of stockinet upon the felt, a band of rubber-like material and metallic strip material in spaced-apart helical convolutions outwardly thereof, and a tape of rubberized fabric upon the metallic strip material in spaced-apart helical convolutions.

2. Ventilating hose comprising a light weight body having an inner layer of sound-deadening felt, a continuous metallic strip disposed in helical convolutions to prevent collapse of the body, a continuous layer of stockinet or the like stretchable fabric in the body, and rubber-like material disposed between the convolutions of the metallic strip for holding the elements of the body together while permitting a high degree of flexibility of the hose.

3. Ventilating hose comprising a light weight body having an inner layer of sound-deadening felt, a continuous metallic strip disposed in helical convolutions to prevent collapse of the body, a continuous layer of stockinet or like stretchable fabric in the body, a tape disposed in spaced-apart helical convolutions and following the course of metallic strip material upon the same, and rubber-like material disposed between the convolutions of the metallic strip for holding the elements of the body together while permitting a high degree of flexibility of the hose.

ANDREW D. MACLACHLAN.